UNITED STATES PATENT OFFICE.

GEORGE W. SCOLLAY, OF NEW YORK, N. Y.

PROCESS OF REFINING COTTON-SEED OIL.

SPECIFICATION forming part of Letters Patent No. 378,113, dated February 21, 1888.

Application filed May 25, 1887. Serial No. 239,329. (No specimens.)

*To all whom it may concern:*

Be it known that I, GEORGE W. SCOLLAY, a citizen of the United States, at present residing in the city, county, and State of New York, have invented certain new and useful Improvements in the Art of Refining Cotton-Seed Oil and Making Paint in a Single Operation; and I do hereby declare the following to be a description of my said invention and of the manner of practicing the same in such full, clear, concise, and exact terms as to enable any one skilled in the arts to which it appertains or with which it is most nearly connected to make and use the same, reference being had to a previous specification, making part of an application for a patent for an invention pertaining to the same general subject-matter, and which application was filed September 18, 1886, and bears Serial No. 213,926.

The invention covered by the claim of the above-mentioned specification is a process which consists of treating the oil with any of the ochers that are suitable to be used in the manufacture of mineral paint by which the impurities of the oil are combined with the ocher and of then separating the refined oil from the ocher carrying the impurities, thus obtaining a double product consisting of refined oil and a paint having a mineral base or pigment combined with the oily residuum.

The invention making the subject-matter of this application consists, broadly considered, of a process of producing refined cotton-seed oil and a paint as the resultant of a single operation, consisting of treating the oil and the impurities carried with it with a refining agent not ultimately injurious to the oil as an article of food and which unites with the oily impurities, producing a paint, and of subsequently separating the paint and oil, and in this generic sense it includes the use not only of chloride of iron and soda, as herein described, but also of ocher, as described in said application No. 213,926 and herein, and any other materials or combinations of materials which may be employed with substantially the same results.

It also consists of treating the oil with chloride of iron and an alkali, the effect of which is to refine the oil and produce a residuum suitable for paint.

The following is a brief statement of the process employed when ocher is used, which process is more fully described in my pending application: I first prepare a suitable ocher— such as hematite and limonite used as pigments in making paint—by evaporating or removing all uncombined water, and when yellow ocher is used I continue the drying until the ocher assumes an orange color, and in the use of sienna and umbers I continue the heat or drying until the umbers assume a deep brown color and the sienna until it assumes a light red color. In the drying of the ocher, which is to be used to refine the oil care should be taken not to continue the heat until all of the constitutional water is removed, as in that case it will not so effectually remove the coloring-matter of the oil. When the ocher has been thus prepared, it is made as fine as possible. I then take the cotton-seed oil of commerce and mix with it the aforesaid ocher, varying the proportions from four (4) to twelve (12) parts of the oil to one (1) part of ocher, according to the amount of the impurities contained in the oil. I then agitate briskly the combined oil and ocher for forty (40) minutes. The result of this operation is a pure water-white oil, and a paint consisting of the ocher combined with the coloring-matter and other impurities of the oil. As soon as the combined oil and ocher have been sufficiently agitated and the refining is completed, the oil may be separated from the ocher by means of any suitable filter-press; or it may be left to settle for twenty-four hours and then drawn off, leaving only the residuum to be filtered, which, as it comes from the press, is a stiff paste or ocher-oil and its impurities in the form of a cake, and is readily reduced to a merchantable paint by grinding it with linseed-oil in an ordinary paint-mill.

The following is a description of the manner in which I employ chloride of iron in the treatment of cotton-seed oil: I mix together the crude oil and the chloride of iron, preferably sesquichloride of iron, in the proportion of one ounce of oil to four grains of the chloride in solution, raising the temperature of the oil to about summer-heat and agitating it thoroughly for about twenty minutes. I then add to the mass of chloride of iron and oil in agitation one equivalent of any suitable alkali, or sufficient to precipitate the iron hydrate, and continue the agitation about twenty minutes longer, at the end of which time the oil is refined and is ready for the filter, which may be of any variety that will effectually separate the residuum from the oil. Soda-ash or caustic soda, or any suitable alkaline earth not ultimately injurious to the oil as an article of food, may be used to precipitate the iron hydrate.

The chloride of iron may be mixed with the oil dry in the form of a powder, or it may be used, as I prefer, in the form of a solution, water being used as the solvent in quantity just sufficient to make a solution.

In the practice of the process the proportion of chloride of iron may be increased or diminished, according to the quality of the oil to be treated and the amount of residual paint desired, the amount being increased in the treatment of heavy black old crude oil and decreased in the treatment of the yellow oil of commerce or new clean crude oil.

In the operation above described the chloride of iron is converted into iron hydrate, which is a pigment, and the chlorides of the alkali or alkaline earth employed, being in solution, are pressed out of the filter with the oil, thus leaving the pigment to be mixed with or united with the residuum of the oil, which forms a paint suitable for use in the trades and arts.

In the foregoing description I have referred only to the treatment of cotton-seed oil; but my invention embraces and includes the treatment of other vegetable-oils—such as linseed or poppy-seed oils and the like—in the same way for the same purpose; and it also includes the use of any chemicals suitable to be used as substitutes for those mentioned.

The features that distinguish the process last above described from that described in my application filed September 18, 1886, is in the use of chloride of iron as a refining agent instead of the ocher, which is an oxide of iron, and in the treatment of the oil and chloride of iron during the process of refining with an alkali. The two processes are alike in that they both refine the oil and produce a residuum which may be used as a paint, and this feature is intended to be broadly covered herein; but in the former case the refining agent when put in the oil is a pigment, while in the present case the refining agent becomes a pigment in the process of refining and combines with the residuum of the oil, making a good merchantable paint. Therefore both processes yield the same result—viz., a refined oil and a paint—thus avoiding all waste in the operation of refining. It should be noted, also, that the process herein described is much more effectual and expeditious in the treatment of crude oils, and especially those that are old, gross, or sour, while it is just as effectual in the treatment of the yellow oil of commerce, and I do not discover any objection to the pigment produced as a basis for the paint.

I have filed on even date herewith an application for a patent bearing Serial No. 239,330, for improvements in the treatment of cotton-seed oil allied to those covered in this application.

Having now described my improvement in the art of refining vegetable-oil and manufacturing paint in a single operation, and having pointed out the points of similarity and difference between the processes described in my present application, the points of novelty I desire to patent are designated in the following claims.

I claim—

1. The process, substantially herein described, of producing a refined cotton-seed oil and a paint as the resultants of a single operation, which process consists of mixing the oil and the impurities carried in it with a refining agent not ultimately injurious to the oil as an article of food, and which unites with the oily impurities, producing a paint, and of subsequently separating the paint and oil.

2. The process, substantially herein described, of refining cotton-seed oil and making paint in a single operation, which process consists of mixing the oil with a suitable metallic chloride not ultimately injurious to the oil as an article of food, such as chloride of iron, and a suitable alkali, such as caustic soda, and of subsequently separating the oil and paint.

Dated May 24, 1887.

GEO. W. SCOLLAY.

Witnesses:
AMOS BROADNAX,
J. EDGAR BULL.